United States Patent
Dolezilek et al.

(10) Patent No.: US 12,212,469 B2
(45) Date of Patent: *Jan. 28, 2025

(54) OFFLINE TEST MODE SDN VALIDATION

(71) Applicant: Schweitzer Engineering Laboratories, Inc., Pullman, WA (US)

(72) Inventors: David J. Dolezilek, Pullman, WA (US); Amandeep Singh Kalra, Mill Creek, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/522,744

(22) Filed: Nov. 29, 2023

(65) Prior Publication Data

US 2024/0097987 A1 Mar. 21, 2024

Related U.S. Application Data

(63) Continuation of application No. 17/808,192, filed on Jun. 22, 2022, now Pat. No. 11,882,002.

(51) Int. Cl.
*G06F 21/00* (2013.01)
*H04L 9/40* (2022.01)
*H04L 41/122* (2022.01)
*H04L 43/50* (2022.01)

(52) U.S. Cl.
CPC ............ *H04L 41/122* (2022.05); *H04L 43/50* (2013.01); *H04L 63/1408* (2013.01)

(58) Field of Classification Search
None
See application file for complete search history.

(56) References Cited

U.S. PATENT DOCUMENTS

| | | | |
|---|---|---|---|
| 9,038,151 B1 * | 5/2015 | Chua | H04L 47/10 |
| | | | 726/1 |
| 9,571,523 B2 * | 2/2017 | Porras | H04L 67/63 |
| 2016/0112246 A1 * | 4/2016 | Singh | H04L 43/065 |
| | | | 370/254 |
| 2017/0026349 A1 * | 1/2017 | Smith | H04L 45/38 |
| 2018/0309632 A1 * | 10/2018 | Kompella | H04L 41/0866 |
| 2018/0351818 A1 * | 12/2018 | Mohanram | H04L 63/0263 |

FOREIGN PATENT DOCUMENTS

| | | | | |
|---|---|---|---|---|
| CN | 110225008 B | * | 7/2020 | H04L 41/14 |
| JP | 6832990 B2 | * | 2/2021 | G06F 21/55 |

* cited by examiner

*Primary Examiner* — Christopher B Robinson
(74) *Attorney, Agent, or Firm* — Justin K. Flanagan; Richard M. Edge

(57) ABSTRACT

Various examples of systems and methods are described herein in which multiple intelligent electronic devices (IEDs) are connected in a network. A software-defined network (SDN) controller may include a rule subsystem, a test mode subsystem, a packet inspection subsystem, and a validation subsystem. The rule subsystem may define a plurality of flow rules. A test mode subsystem may operate the SDN in a testing mode. A packet insertion subsystem may insert test packets within the SDN while the SDN is in the testing mode. The validation subsystem may validate or fail each flow rule depending on how the various test packets are handled.

21 Claims, 4 Drawing Sheets

OFFLINE TEST MODE SDN VALIDATION

RELATED APPLICATIONS

This application is a continuation of and claims priority to U.S. patent application Ser. No. 17/808,192, filed on Jun. 22, 2022, titled "Offline Test Mode SDN Validation," which application is hereby incorporated by reference in its entirety.

TECHNICAL FIELD

This disclosure relates to intelligent electronic devices (IEDs) in a software-defined network (SDN). More specifically, this disclosure relates to SDN validation.

BRIEF DESCRIPTION OF THE DRAWINGS

The written disclosure herein describes illustrative embodiments that are non-limiting and non-exhaustive. This disclosure references certain of such illustrative embodiments depicted in the figures described below.

DETAILED DESCRIPTION

Figure 1:
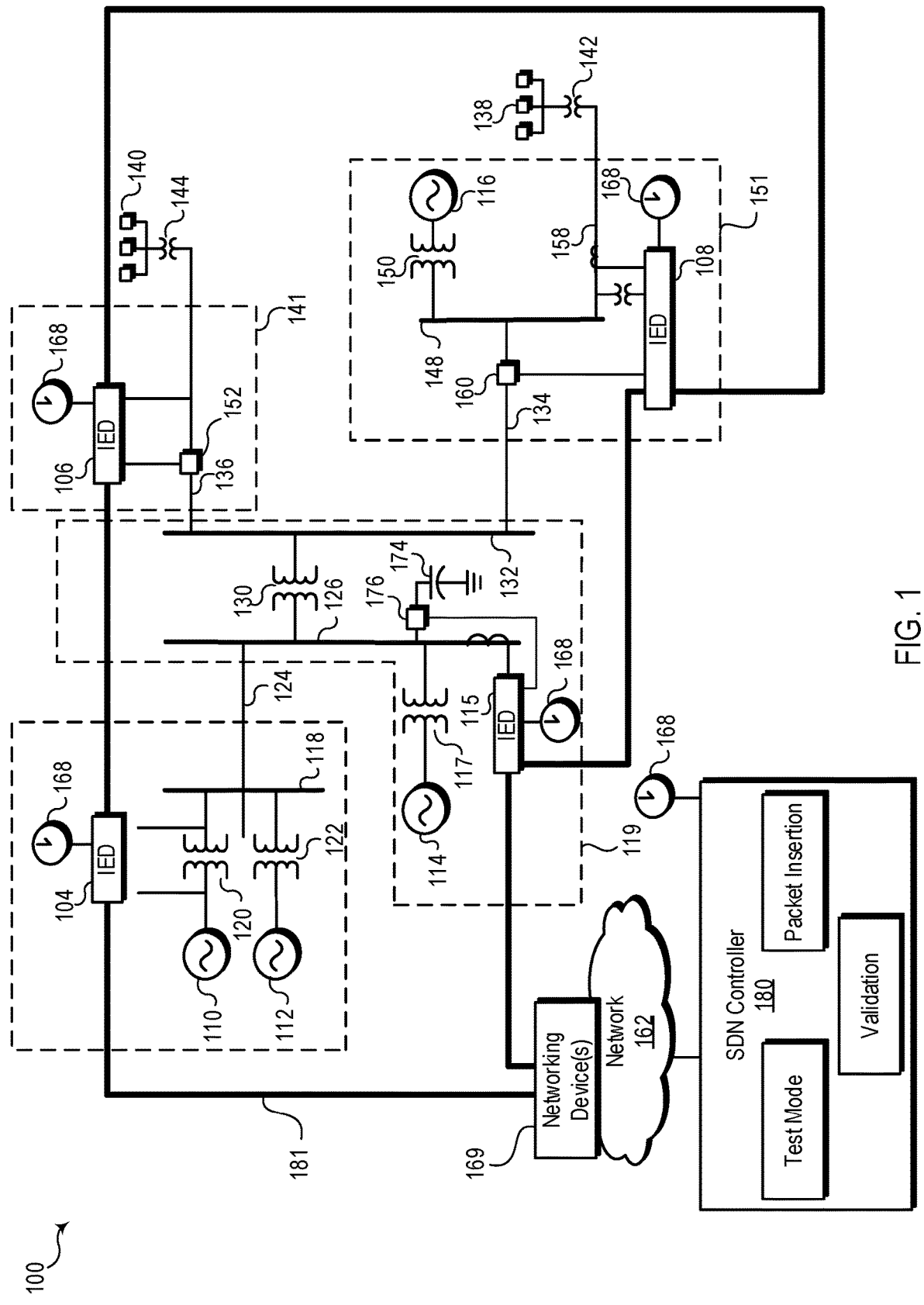
FIG. 1 illustrates an example of a simplified one-line diagram of an electric power transmission and distribution system in which various intelligent electronic devices (IEDs) are connected in a software-defined network (SDN).

Many industrial control systems including, but not limited to, electric power systems, include various control, monitoring, and/or protection devices. A wide variety of communication and networking technologies may enable control, protection, and/or monitoring functions within an electric power distribution or transmission system. Communication and networking devices may, among other things, facilitate an exchange of information, the transmission of control instructions, and/or enable data acquisition.

Some electric power distribution and transmission systems utilize software-defined network (SDN) technologies to configure intelligent electronic devices (IEDs) and/or regulate communications on a network interconnecting data stores, control devices, monitoring devices, protective devices, human interfaces, and/or other electronic equipment.

An SDN controller may define flow rules for data packet communications between the various IEDs in the network as part of an SDN. For example, a network engineer or other information technology (IT) technician may use an SDN controller (e.g., a software application running on a computing device) to configure IEDs and/or networking devices. The IEDs may be configured to monitor, control, and/or protect various aspects of the electric power distribution and transmission system, communicate with one another, and/or communicate with systems and devices external to the SDN.

In various embodiments, a network communication system for an electric power distribution and/or transmission system may include multiple IEDs. The IEDs may be connected to one another, other networking devices, and/or external networks via a communication network (e.g., via network ports, network adapters, network cables, wireless network bands, and/or other network infrastructure). The communication network may be an SDN, managed, operated, controlled, tested, and/or otherwise configured by an SDN controller.

In various embodiments, the SDN controller may include a rule subsystem to define a plurality of flow rules for network communication between the IEDs in the network as part of an SDN. The SDN controller may include a test mode subsystem to operate the SDN in one or more testing modes to test one or more of the flow rules (e.g., communication protocols, protection flow rules, communication flow rules, packet mirroring instructions, routing instructions, quality of service (QoS) settings, etc.) defined by the rule subsystem of the SDN controller. The SDN controller may include a packet insertion subsystem to insert one or more test packets within the SDN while the SDN is in one or more of the testing modes to test one or more flow rules of the plurality of flow rules defined by the SDN controller.

The SDN controller may include a validation subsystem to validate the functionality of tested flow rules based on the test packets being handled according to the tested flow rules. The validation subsystem of the SDN controller may also report errors or failed validations when a test packet or test packets are not handled according to the various tested flow rules.

In various embodiments, the SDN controller may set the SDN in a testing mode in which network communication between the various IEDs is suspended or restricted to a particular communication protocol and/or to the handling of the injected test packets. For example, the SDN controller may operate the SDN in a testing mode to test a SCADA protocol. The SDN controller may restrict or limit the SDN, including the IEDs and any other network devices, to communications via the SCADA protocol. The SDN controller may inject one or more test packets to test the functionality of the SCADA protocol on the SDN (e.g., the functionality of the SCADA protection schemes, routing, mirroring, QoS, etc.)

As another example, the SDN controller may operate the SDN in a testing mode with limited or no network traffic other than the injected test packets. The injected test packets may be monitored to verify the functionality (or detect a failure) of port mirroring, packet multiplying, packet QoS routing, packet routing, individual protocol functionality, concurrent protocol functionalities, or the like. For instance, the SDN controller may operate the SDN in a testing mode to iteratively test each individual protocol and/or each unique combination of protocols to verify functionality and/or identify specific protocol functionality failures. The SDN controller may test any number of possible communication protocols, including, but not limited to, a SCADA protocol, a DNP3 protocol, a GOOSE protocol, and any of a wide variety of Ethernet-based protocols.

As another example, the SDN controller may operate the SDN in a testing mode to iteratively test each individual flow rule (protection, routing, mirroring, etc.) and/or each combination of flow rules. Any of a wide variety of flow rules may be tested, including protection flow rules, packet inspection flow rules, packet mirroring flow rules, deep packet inspection flow rules, time-window flow rules, and/or the like. Additional embodiments, specific examples, and some variations are described below in conjunction with the figures.

Unless the context dictates otherwise, the phrases "connected to" and "in communication with" refer to any form of interaction between two or more components, including mechanical, electrical, magnetic, and electromagnetic interaction. Two components may be connected to each other, even though they are not in direct contact with each other, and even though there may be intermediary devices between the two components.

As used herein, the term "IED" may refer to any microprocessor-based device that monitors, controls, automates, and/or protects monitored equipment within a system. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, motor drives, and the like. IEDs may be connected to a network, and communication on the network may be facilitated by networking devices including, but not limited to, multiplexers, routers, hubs, gateways, firewalls, and switches. Furthermore, networking and communication devices may be incorporated into an IED or be in communication with an IED. The term "IED" may be used interchangeably to describe an individual IED or a system comprising multiple IEDs.

Some of the infrastructure that can be used with embodiments disclosed herein is already available, such as general-purpose computers, computer programming tools and techniques, digital storage media, virtual computers, virtual networking devices, and communications networks. A computer may include a processor, such as a microprocessor, microcontroller, logic circuitry, or the like. The processor may include a special-purpose processing device, such as an ASIC, PAL, PLA, PLD, FPGA, or another customized or programmable device. The computer may also include a computer-readable storage device, such as non-volatile memory, static RAM, dynamic RAM, ROM, CD-ROM, disk, tape, magnetic, optical, flash memory, or another computer-readable storage medium.

Suitable networks for configuration and/or use, as described herein, include any of a wide variety of network infrastructures. Specifically, a network may incorporate landlines, wireless communication, optical connections, various modulators, demodulators, small form-factor pluggable (SFP) transceivers, routers, hubs, switches, and/or other networking equipment.

The network may include communications or networking software, such as software available from any of a wide variety of companies, and may operate using a wide variety of known protocols over various types of physical network connections, such as twisted pair, coaxial, or optical fiber cables, telephone lines, satellites, microwave relays, modulated AC power lines, physical media transfer, wireless radio links, and/or other data transmission "wires." The network may encompass smaller networks and/or be connectable to other networks through a gateway or similar mechanism. Thus, it is appreciated that the systems and methods described herein are not limited to the specific network types described herein. Rather, any of a wide variety of network architectures may utilize the systems and methods described herein.

Aspects of certain embodiments described herein may be implemented as software modules or components. As used herein, a software module or component may include any type of computer instruction or computer-executable code located within or on a computer-readable storage medium. A software module may, for instance, comprise one or more physical or logical blocks of computer instructions, which may be organized as a routine, program, object, component, data structure, etc. that performs one or more tasks or implements particular abstract data types.

A particular software module may comprise disparate instructions stored in different locations of a computer-readable storage medium, which together implement the described functionality of the module. Indeed, a module may comprise a single instruction or many instructions and may be distributed over several different code segments, among different programs, and across several computer-readable storage media. Some embodiments may be practiced in a distributed computing environment where tasks are performed by a remote processing device linked through a communications network. In a distributed computing environment, software modules may be located in local and/or remote computer-readable storage media. In addition, data being tied or rendered together in a database record may be resident in the same computer-readable storage medium, or across several computer-readable storage media, and may be linked together in fields of a record in a database across a network.

The embodiments of the disclosure can be understood by reference to the drawings, wherein like parts are designated by like numerals throughout. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments. In other instances, well-known structures, materials, or operations are not shown or described in detail to avoid obscuring aspects of this disclosure. In addition, the steps of a method do not necessarily need to be executed in any specific order, or even sequentially, nor need the steps be executed only once, unless otherwise specified.

FIG. 1 illustrates an embodiment of a simplified one-line diagram of an electric power transmission and distribution system 100 in which a plurality of communication devices and/or intelligent electronic devices (IEDs), such as IEDs 104, 106, 108, and 115, facilitate communication in a software-defined network (SDN), consistent with embodiments of the present disclosure. The electric power delivery system 100 may function to generate, transmit, and/or distribute electric energy to loads 138 and 140.

Electric power delivery systems, such as the illustrated system 100, may include equipment, such as electric generators (e.g., generators 110, 112, 114, and 116), power transformers (e.g., transformers 117, 120, 122, 130, 142, 144 and 150), power transmission and delivery lines (e.g., lines 124, 134, 136 and 158), circuit breakers (e.g., breakers 152, 160, 176), busses (e.g., busses 118, 126, 132, and 148), loads (e.g., loads 138 and 140) and/or the like. In some instances, some components may be omitted from the system, and in other instances, some components may be duplicated or used more than once. A variety of other types of equipment may also be included in the electric power delivery system 100, such as voltage regulators, capacitor banks, and a variety of other types of equipment.

A substation 119 may include a generator 114, such as a distributed generator, which may be connected to the bus 126 through the step-up transformer 117. The bus 126 may be connected to the distribution bus 132 via the step-down transformer 130. Various distribution lines 136 and 134 may be connected to the distribution bus 132. The distribution line 136 may lead to the substation 141 and the distribution line 136 may be monitored and/or controlled using an IED 106, which may selectively open and close the breaker 152. The load 140 may be fed from the distribution line 136. The step-down transformer 144 in communication with the distribution bus 132 via the distribution line 136 may be used to step down a voltage for consumption by the load 140.

The distribution line 134 may lead to a substation 151 and deliver electric power to the bus 148. The bus 148 may also receive electric power from the distributed generator 116 via a transformer 150. The distribution line 158 may deliver electric power from the bus 148 to the load 138 and may include another step-down transformer 142. The circuit breaker 160 may be used to selectively connect the bus 148 to the distribution line 134. The IED 108 may be used to monitor and/or control the circuit breaker 160 as well as the distribution line 158.

The electric power delivery system 100 may be monitored, controlled, automated, and/or protected using IEDs, such as IEDs 104, 106, 108, and 115. In general, IEDs in an electric power generation and transmission system may be used for protection, control, automation, and/or monitoring of equipment in the system. For example, IEDs may be used to monitor equipment of many types, including electric transmission lines, electric distribution lines, current transformers, busses, switches, circuit breakers, reclosers, transformers, autotransformers, tap changers, voltage regulators, capacitor banks, generators, motors, pumps, compressors, valves, and a variety of other types of monitored equipment.

As used herein, an IED (such as IEDs 104, 106, 108, and 115) may refer to any microprocessor-based device that monitors, controls, automates, and/or protects monitored equipment within system 100. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, and the like. The term IED may be used to describe an individual IED or a system comprising multiple IEDs.

A common time signal 168 may be distributed throughout system 100. Utilizing a common or universal time source may ensure that IEDs have a synchronized time signal that can be used to generate time-synchronized data, such as synchrophasors. In various embodiments, IEDs 104, 106, 108, and 115 may receive a common time signal 168. The common time signal 168 may be distributed in system 100 using a communications network 162 or using a common time source, such as a Global Navigation Satellite System (GNSS), or the like. The common time signal 168 may be distributed using, for example, PTP or NTP protocols.

According to various embodiments, the system may include a central monitoring system, such as a supervisory control and data acquisition (SCADA) system and/or a wide area control and situational awareness (WACSA) system to coordinate the monitoring, protection, and/or control functions of one or more of the IEDs 104, 106, 108, and 115.

The SDN controller 180 may be configured to interface with one or more of the networking devices 169 and/or IEDs 104, 106, 108, and 115. The SDN controller 180 may facilitate the creation of an SDN 181 within the network 162 that facilitates communication between various devices, including IEDs 104, 106, 108, and 115. In various embodiments, the SDN controller 180 may be configured to interface with a control plane (not shown) in the network 162. An operator may use the SDN controller 180 to define (e.g., program) network operation profiles of one or more of the networking devices 169 connected to the network 162 and IEDs 104, 106, 108, and 115 in the SDN 181.

The SDN controller 180 may include a test mode subsystem, a packet insertion subsystem, and a validation subsystem. The test mode subsystem may operate the SDN 181 in one or more testing modes to test one or more of the flow rules (e.g., communication protocols, protection flow rules, packet mirroring instructions, routing instructions, QoS settings, etc.) defined by the rule subsystem of the SDN controller 180. The SDN controller 180 may include a packet insertion subsystem to insert one or more test packets within the SDN 181 while the SDN 181 is in one or more of the testing modes to test one or more flow rules of the plurality of flow rules defined by the SDN controller 180.

The SDN controller 180 may include a validation subsystem to validate the functionality of tested flow rules based on the test packets being handled according to the tested flow rules. The validation subsystem of the SDN controller 180 may also report errors or failed validations when a test packet or test packets are not handled according to the various tested flow rules.

Figure 2:
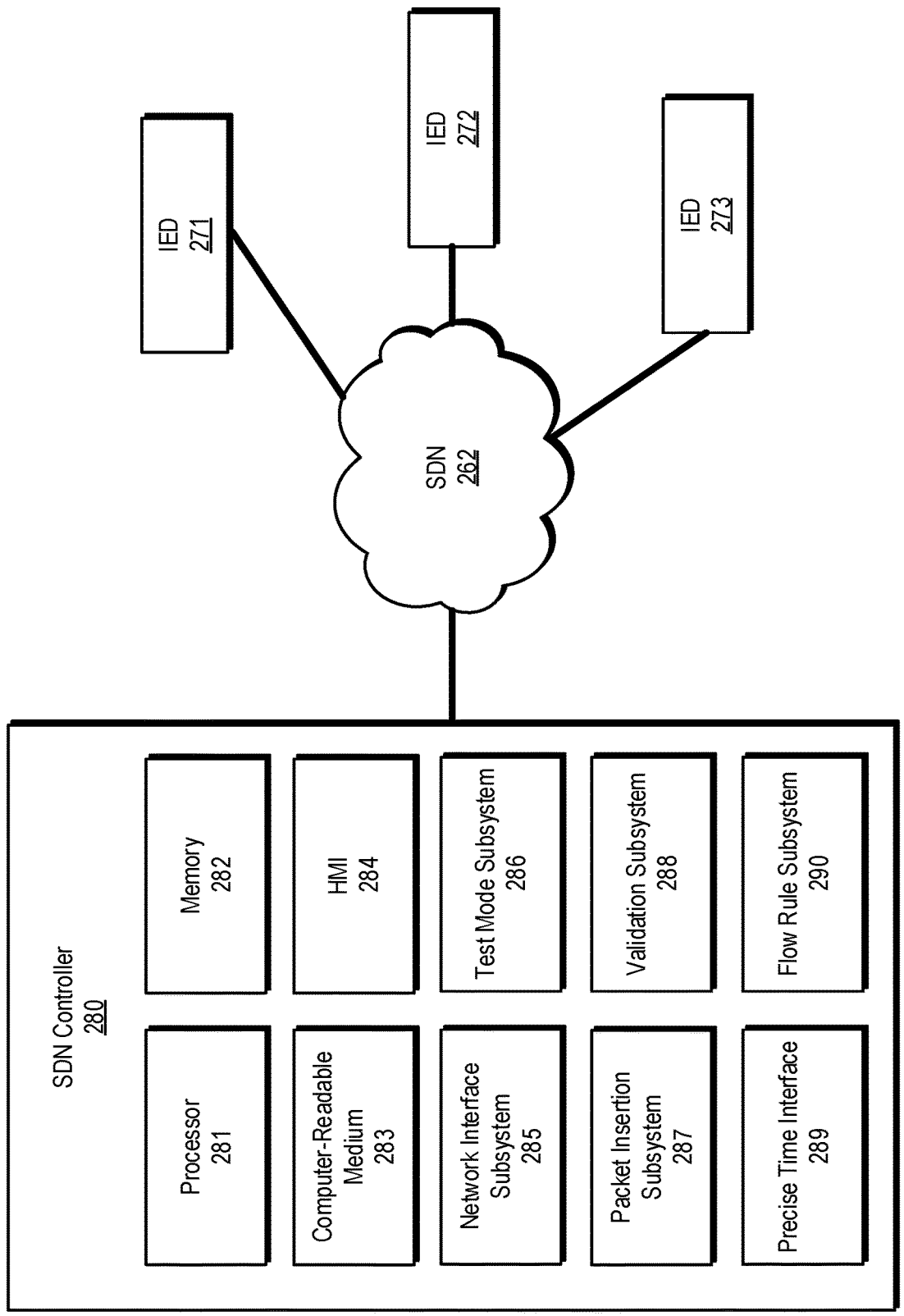
FIG. 2 illustrates an example embodiment of an SDN controller to configure and test an SDN with various IEDs.

FIG. 2 illustrates an example embodiment of an SDN controller 280 to configure and test an SDN 262 with various IEDs 271, 272, and 273. The SDN controller 280 may include a processor 281, memory 282, computer-readable medium 283, a human-machine interface (HMI) 284, a network interface subsystem 285, a test mode subsystem 286, a packet insertion subsystem 287, a validation subsystem 288, a precise time interface 289, and/or a flow rule subsystem 290.

In various embodiments, all or portions of the network interface subsystem 285, the test mode subsystem 286, the packet insertion subsystem 287, the validation subsystem 288, the precise time interface 289, and/or the flow rule subsystem 290 may be implemented as instructions stored within the computer-readable medium 283 for execution by the processor 281 in conjunction with the memory 282. In other embodiments, all or portions of the network interface subsystem 285, the test mode subsystem 286, the packet insertion subsystem 287, the validation subsystem 288, the precise time interface 289, and/or the flow rule subsystem 290 may be implemented as hardware components, such as electronic circuits.

The network interface system 285 may include one or more physical ports and/or other network components for packet forwarding, packet injection, packet mirroring, packet inspection, protocol encapsulation, and/or other network functionality. The test mode subsystem 286 may operate the SDN 262 in one or more testing modes to test one or more of the flow rules (e.g., communication protocols, protection flow rules, packet mirroring instructions, routing instructions, QoS settings, etc.) defined by the flow rule subsystem 290 of the SDN controller 280.

The packet insertion subsystem 287 may operate to insert one or more test packets within the SDN 262 while the SDN 262 is in one or more of the testing modes to test one or more flow rules of the plurality of flow rules defined by the flow rule subsystem 290 of the SDN controller 280. The validation subsystem 288 may operate to validate the functionality of tested flow rules based on the test packets being handled according to the tested flow rules. The validation subsystem 288 may also report errors or failed validations when a test packet or test packets are not handled according to the various tested flow rules.

A precise time interface 289 may generate or receive a precise time that can be used to, for example, set an artificial system time of the SDN 262 and/or the IEDs 271, 272, and 273. The precise time interface 289 may test a time-window flow rule. For example, the flow rule subsystem 290 may define specific flow rules that only operate during specific time windows, operate for set time periods after initiation, and/or are otherwise time-based. The validation subsystem 288 may utilize a precise time from the precise time interface 289 to cause the test mode subsystem 286, packet insertion subsystem 287, and the validation subsystem 288 to test one or more time-window flow rules of the SDN 262, as defined by the flow rule subsystem 290 of the SDN controller 280 or a flow rule subsystem of another SDN controller.

Figure 3:
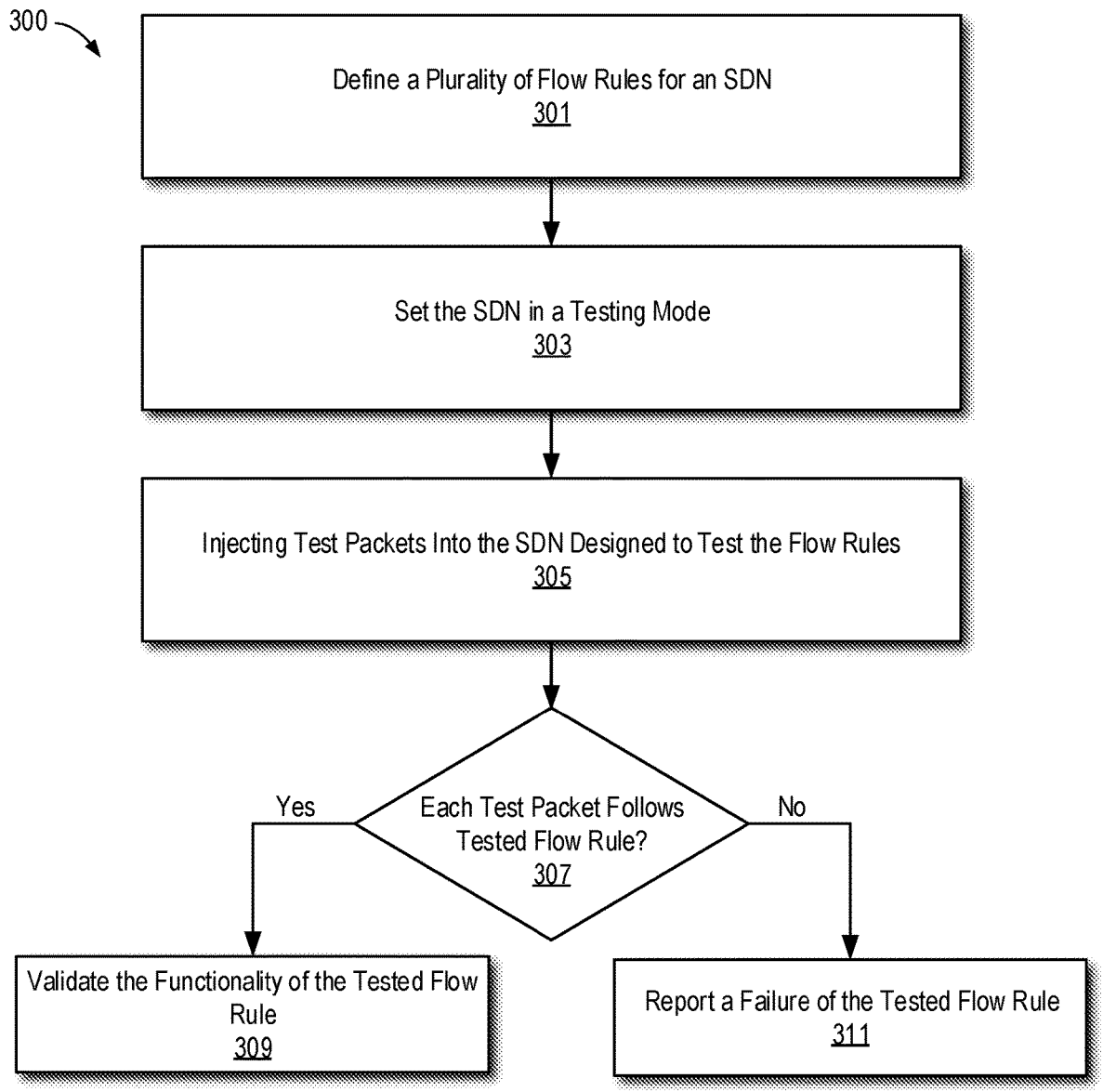
FIG. 3 illustrates an example flow chart of a method to test and validate functional and failed flow rules of the SDN.

FIG. 3 illustrates an example flow chart of a method 300 to test and validate functional and failed flow rules of the SDN. An SDN controller may define, at 301, a plurality of flow rules for an SDN. The SDN controller may set, at 303, the SDN in a testing mode. The SDN controller may inject, at 305, one or more test packets into the SDN that are designed to test one or more of the flow rules of the SDN.

The SDN controller may monitor, at 307, the progress and handling of each of the injected test packets to determine if each test packet is handled according to one or more applicable flow rules. If the test packet is handled correctly, the tested flow rule is validated, at 309. If the test packet is not handled correctly, the tested flow rule is reported, at 311, as having failed validation.

Figure 4:
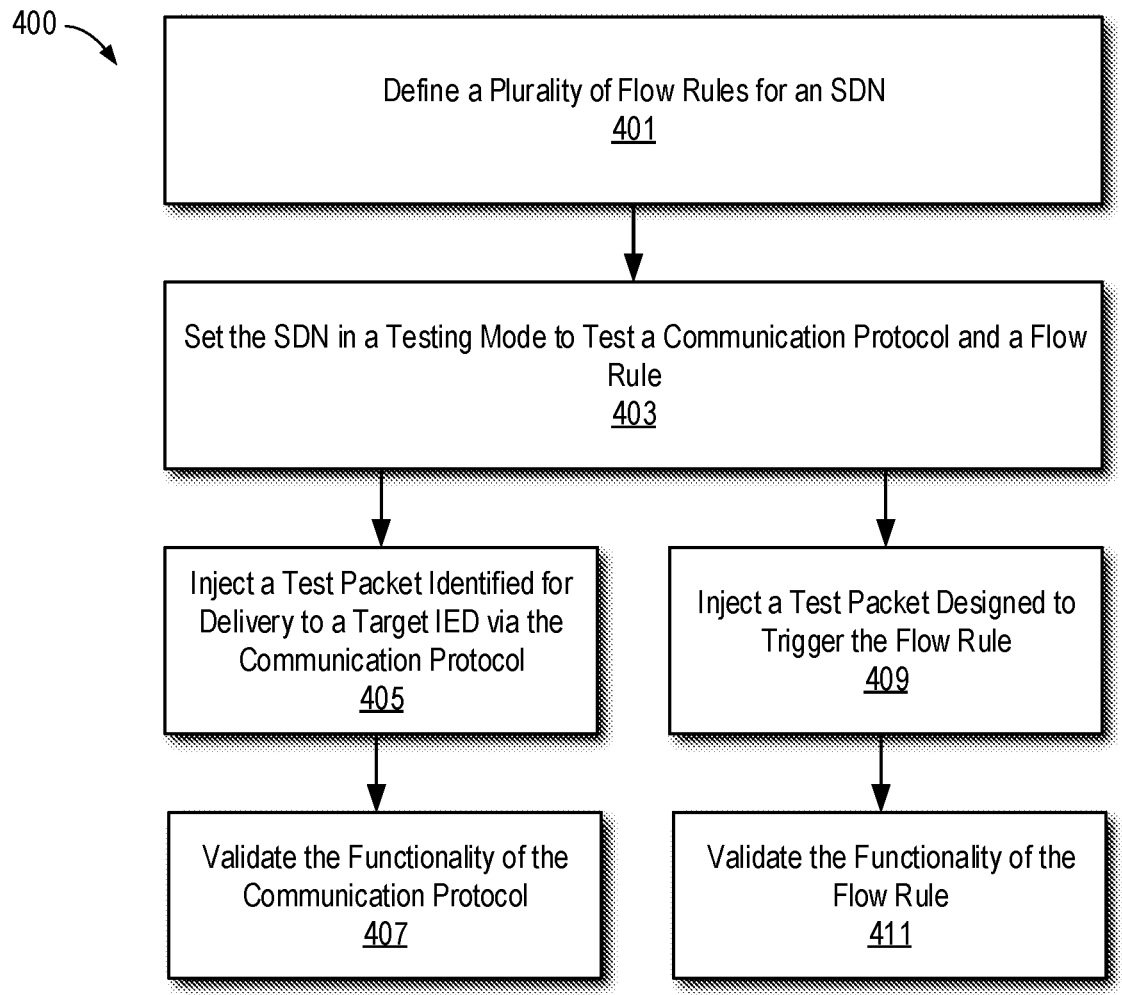
FIG. 4 illustrates an example flow chart of a method to validate a communication protocol and a flow rule.

FIG. 4 illustrates an example flow chart of a method 400 to validate a communication protocol and a communication flow rule. An SDN controller may define, at 401, a plurality of flow rules for an SDN. The flow rules may include communication protocol flow rules, other types of communication flow rules, and/or protection flow rules. For example, the flow rules may enable some communication protocols, disable some communication protocols, enable some communication protocols during certain time windows, disable some communication protocols during certain time windows, and/or otherwise control the availability, routing, inspection, QoS, and/or other handling characteristics of data packets originating and/or forwarded in one or more communication protocols.

In some instances, the flow rules may include protection flow rules that, for example, are triggered based on characteristics of a transmitted data packet, the origin of a transmitted data packet, and/or the intended destination of a transmitted data packet. The protection flow rules may cause triggering data packets to be inspected, mirrored, quarantined, and/or cause the SDN to enter a protection mode with reduced functionality in response to detecting a threat.

The SDN controller may set, at 403, the SDN in a testing mode to test the functionality of one or more of the communication protocols and/or a communication flow rule (e.g., a protection flow rule). For example, the SDN controller may test that a specific communication protocol functions as expected and/or that a specific communication protocol is disabled as expected. The SDN controller may inject, at 405, a test packet identified for delivery to a target IED via a specific communication protocol. The SDN controller may validate, at 407, the functionality of the communication protocol based on the injected test packet arriving at the intended target IED when the communication protocol is enabled by a tested flow rule, or not arriving at the intended target IED when the communication protocol is disabled by a tested flow rule.

The SDN controller may concurrently or sequentially inject, at 409, a test packet designed to trigger a specific flow rule. The SDN controller may validate, at 411, the functionality of the flow rule based on a determination that an expected action was implemented. For example, the SDN controller may validate, at 411, the functionality of a protection flow rule based on a determination that an expected protective action was implemented according to the protection flow rule being tested.

In some cases, well-known features, structures, or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations. Thus, all feasible permutations and combinations of embodiments are contemplated.

Several aspects of the embodiments described may be implemented using hardware, firmware and/or software modules or components. As used herein, a module or component may include various hardware components, firmware code, and/or any type of computer instruction or computer-executable code located within a memory device and/or transmitted as transitory or non-transitory electronic signals over a system bus or wired or wireless network. Many of the embodiments described herein are shown in block diagram form and/or using logic symbols. It is appreciated that various elements of each of the illustrated and described embodiments could be implemented using FPGAs, custom ASICs, and/or as hardware/software combinations.

In the description above, various features are sometimes grouped in a single embodiment, figure, or description thereof to streamline this disclosure. This method of disclosure, however, is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims are hereby expressly incorporated into this Detailed Description, with each claim standing on its own as a separate embodiment. This disclosure also includes all permutations and combinations of the independent claims with their dependent claims.

What is claimed is:

1. A method, comprising:
defining, via a software-defined network (SDN) controller, a plurality of flow rules for network communication between a plurality of intelligent electronic devices (IEDs) in an SDN, including a security flow rule;
setting the SDN in a testing mode for individually testing each of a plurality of flow rules defined by the SDN controller;
sequentially inserting test packets within the SDN that are each identified to test a different flow rule of the plurality of flow rules defined by the SDN controller, wherein one of the sequentially inserted test packets comprises a security test packet configured to trigger the security flow rule;
validating functionality of each tested flow rule triggered by a test packet, including validating the functionality of the security flow rule based on verification that the security test packet is handled according to the security flow rule; and
reporting a failure to validate each flow rule not triggered by at least one of the test packets.

2. The method of claim 1, wherein the test packets comprise protocol test packets that are each identified for delivery to a target IED in the SDN via a different communication protocol.

3. The method of claim 2, wherein validating the functionality of each tested flow rule triggered by a test packet comprises a verification of delivery of each protocol test packet to each respective target IED via a respective communication protocol.

4. The method of claim 2, wherein the protocol test packets comprise protocol test packets identified for delivery via at least one of: a SCADA protocol, a mirrored bits protocol, a DNP3 protocol, and a GOOSE protocol.

5. The method of claim 2, wherein the protocol test packets comprise protocol test packets identified for delivery via an Ethernet protocol.

6. The method of claim 1, wherein one of the flow rules of the plurality of flow rules defined by the SDN controller comprises a time-window flow rule,
wherein the test packets comprise a time-rule test packet designed to trigger the time-window flow rule, and
wherein the testing mode comprises:
a first testing period during which a system time is artificially set to trigger the time-window flow rule, and
a second testing period during which the system time is artificially set to not trigger the time-window flow rule.

7. The method of claim 6, wherein validating the functionality of the time-window flow rule comprises verifying that the time-rule test packet was handled according to flow rules of the time-window flow rule during the first testing period and handled differently during the second testing period.

8. The method of claim 5, wherein the security flow rule comprises a packet inspection flow rule,
wherein the security test packet is designed to trigger the packet inspection flow rule, and
wherein validating the functionality of the packet inspection flow rule comprises verifying that the security test packet is delivered for packet inspection.

9. The method of claim 8, wherein the packet inspection comprises an inspection of at least a portion of the packet.

10. A method, comprising:
defining, via a software-defined network (SDN) controller, flow path rules for network communication between a plurality of intelligent electronic devices (IEDs) in an SDN, including a packet inspection flow path rule;
setting the SDN in a testing mode for testing:
functionality of a first communication protocol, and
functionality of the packet inspection flow path rule;
inserting a first test packet within the SDN identified for delivery to a target IED in the SDN via the first communication protocol;
inserting a second test packet within the SDN designed to trigger the packet inspection flow path rule;
monitoring the first and second inserted test packets within the SDN;
validating the functionality of the first communication protocol in response to confirmation of delivery of the first test packet to the target IED; and
validating the functionality of the packet inspection flow path rule in response to confirmation that the second test packet triggered was subjected to packet inspection of at least a portion of the packet.

11. The method of claim 10, wherein the testing mode of the SDN restricts network communication to the first communication protocol.

12. The method of claim 10, wherein the first communication protocol comprises one of: a SCADA protocol, a mirrored bits protocol, a DNP3 protocol, and a GOOSE protocol.

13. The method of claim 10, wherein the first communication protocol comprises an Ethernet protocol.

14. The method of claim 10, wherein the testing mode of the SDN restricts communication between the IEDs except as relating to the first and second test packets.

15. The method of claim 10, wherein the second test packet is additionally identified for delivery to the target IED in the SDN via the first communication protocol, and wherein validating the functionality of the packet inspection flow path rule further comprises validating the second test packet was delivered to the target IED after the packet inspection.

16. The method of claim 10, wherein the second test packet is additionally identified for delivery to the target IED in the SDN via the first communication protocol, and wherein validating the functionality of the packet inspection flow path rule further comprises validating the second test packet was prevented from being delivered to the target IED after the packet inspection.

17. A network communication system, comprising:
intelligent electronic devices (IEDs);
a communication network to communicatively connect the IEDs in a network; and
a software-defined network (SDN) controller comprising:
a rule subsystem to define a plurality of flow rules for network communication between the IEDs in the network as part of an SDN, including a packet inspection flow rule;
a test mode subsystem to operate the SDN in a testing mode to test at least some of the flow rules defined by the rule subsystem of the SDN controller;
a packet insertion subsystem to insert a security test packet within the SDN while the SDN is in the testing mode to test the packet inspection flow rule; and
a validation subsystem to:
validate functionality of the packet inspection flow rule in response to the security test packet being delivered for packet inspection; and
report an error in response to the security test packet failing to be delivered for packet inspection.

18. The network communication system of claim 17, wherein the test mode subsystem is further configured to insert a protocol test packet identified for delivery to a target IED in the SDN via a first communication protocol.

19. The network communication system of claim 18, wherein one of the flow rules comprises a protocol flow rule for directing data packets via a first communication protocol, and
wherein the validation subsystem is configured to validate the functionality of the protocol flow rule based on a verification of delivery of the protocol test packet to the target IED via the first communication protocol.

20. The network communication system of claim 18, wherein the protocol test packet comprises protocol test packets identified for delivery via at least one of: a SCADA protocol, a mirrored bits protocol, a DNP3 protocol, and a GOOSE protocol.

21. The network communication system of claim 18, wherein the protocol test packet comprises protocol test packets identified for delivery via an Ethernet protocol.

* * * * *